No. 646,790. Patented Apr. 3, 1900.
J. BELL.
VEHICLE WHEEL.
(Application filed Feb. 3, 1900.)
(No Model.)
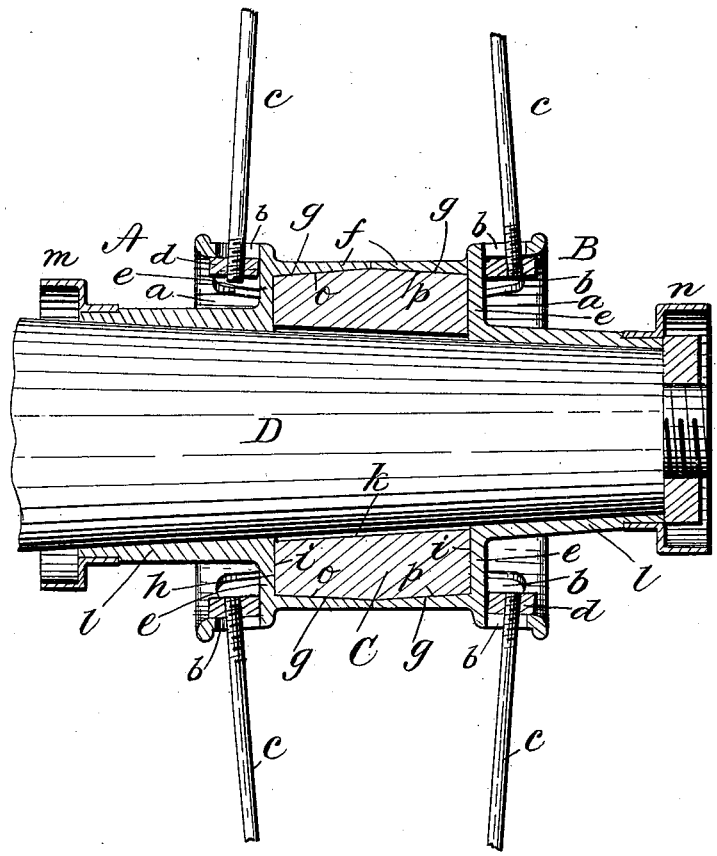
Witnesses
George J. Weber
W. Parker Reinohl
Inventor
John Bell.
By D. C. Reinohl
Attorney

UNITED STATES PATENT OFFICE.

JOHN BELL, OF TORONTO, CANADA, ASSIGNOR OF ONE-HALF TO JOHN HENRY McKNIGHT, OF SAME PLACE.

VEHICLE-WHEEL.

SPECIFICATION forming part of Letters Patent No. 646,790, dated April 3, 1900.

Application filed February 3, 1900. Serial No. 3,860. (No model.)

*To all whom it may concern:*

Be it known that I, JOHN BELL, a subject of the Queen of Great Britain, residing at 954 Queen street, west, Toronto, in the Province of Ontario, Dominion of Canada, have invented certain new and useful Improvements in Vehicle-Wheels; and I do hereby declare the following to be a full, clear, and exact description of the invention, such as will enable others skilled in the art to which it appertains to make and use the same.

My invention relates to vehicle-wheels, has especial reference to the hub, has for its object the production of a strong, durable, and light hub at a minimum cost, and consists in certain improvements in construction which will be fully disclosed in the following specification and claims.

The drawing shows a hub in vertical longitudinal section, the axle-journal and part of the spokes in side elevation.

Reference being had to the drawing and the letters thereon, A indicates the inner section, and B the outer section, of the hub, made of cast metal, and C the middle section or core, preferably made of wood for large and heavy wheels; but it may be made of light metal, such as aluminium, for small and light wheels. Each section A B is provided with an annular spoke-flange $a$, having elongated slots $b$ therein to receive the inner ends of the spokes $c$, and the spokes are secured to the flange $a$ by nuts $d$, one side of which bears against the vertical and concentric wall $e$ to prevent turning on the spoke and becoming accidentally disengaged therefrom, annular flanges $f$ extending inward toward the longitudinal center of and meeting at the center to completely encircle and inclose the section C of the hub, the inner surfaces $g$ of said flanges being tapered, preferably, throughout their length and, in conjunction with the concentric wall $e$, form a chamber $h$ to receive the section C, whose ends rest against the inner sides $i$ of the wall $e$ and prevent the escape of a lubricant from the chamber $k$. The chamber $k$ is formed by boring the section C slightly larger in diameter than the adjacent portion of the bore of the hub.

Each section A B is provided with an elongated annular extension $l$ of a length about equal to the length of the section C to form bearings for the journal D of the axle at each end thereof, with the lubricant-chamber $k$ between them, from which the lubricant is distributed to the journal of the axle and the bearings of the hub.

The sections A B are provided with sand-bands $m$ $n$, preferably shrunk thereon.

In assembling the parts of the hub the flanges $f$ of the sections are pushed over the opposite tapering portions $o$ $p$ of the section C, when the spokes $c$ are inserted, and when drawn taut between the rim or felly of the wheel (not shown) and the hub the tension of the spokes draws the sections A B toward the longitudinal center of the hub and retains them in position on the section C.

The sections A B may be made of malleable cast-iron and are therefore capable of resisting rough usage, wear, and tear and can be made at a very small cost.

Having thus fully described my invention, what I claim is—

1. A hub for vehicle-wheels made of two opposite sections having flanges extending inwardly and meeting in the longitudinal center of the hub and oppositely-extended axle-bearings, and a section interposed between said opposite sections and completely inclosed by said flanges.

2. A hub for vehicle-wheels made of two opposite sections having extended axle-bearings, oppositely-extending annular flanges meeting at the longitudinal center of the hub and an annular spoke-flange; and a section interposed between the former sections, out of contact with the journal of the axle and completely inclosed by said flanges.

3. A hub for vehicle-wheels, made of two opposite metallic sections having outwardly-extended axle-bearings and inwardly-extended flanges, a concentric wall between the bearings and the flanges, and an annular spoke-flange; and a wooden section interposed between the metallic sections and inclosed by said inwardly-extended flanges.

4. A hub for vehicle-wheels, made of two opposite end sections having extended axle-bearings and internally-tapered and inwardly-extended flanges meeting in the longitudinal center of the hub, and a wooden section externally tapered in opposite directions, provided with a bore of greater diameter than the journal of the axle and contained within said flanges of the end sections.

In testimony whereof I affix my signature in presence of two witnesses.

JNO. BELL.

Witnesses:
F. S. MEARNS,
A. H. MONTEITH.